United States Patent [19]

Wehrs

[11] Patent Number: 5,079,957
[45] Date of Patent: Jan. 14, 1992

[54] CONVERSION CIRCUIT FOR AN ELECTROMAGNETIC FLOW TRANSMITTER

[75] Inventor: David L. Wehrs, Eden Prairie, Minn.

[73] Assignee: Rosemount Inc., Eden Prairie, Minn.

[21] Appl. No.: 409,935

[22] Filed: Sep. 20, 1989

[51] Int. Cl.⁵ .............................................. G01F 1/60
[52] U.S. Cl. .................................................. 73/861.17
[58] Field of Search ........................ 73/861.16, 861.17

[56] References Cited

U.S. PATENT DOCUMENTS

| | | |
|---|---|---|
| 3,783,687 | 1/1974 | Mannherz et al. . |
| 4,303,980 | 12/1981 | Yard . |
| 4,306,461 | 12/1981 | Grebe, Jr. . |
| 4,309,909 | 1/1982 | Grebe, Jr. et al. . |
| 4,339,958 | 7/1982 | Shauger . |
| 4,417,479 | 11/1983 | Schmoock et al. . |
| 4,598,251 | 7/1986 | Wehrs . |
| 4,644,799 | 2/1987 | Tomita . |
| 4,672,331 | 6/1987 | Cushing ................. 73/861.17 X |
| 4,680,973 | 7/1987 | Kobayashi et al. . |
| 4,723,449 | 2/1988 | Tiley ................................ 73/861.17 |
| 4,766,770 | 8/1988 | Mannherz et al. . |

Primary Examiner—Charles A. Ruehl
Attorney, Agent, or Firm—Kinney & Lange

[57] ABSTRACT

A magnetic flowmeter generates an alternating potential representing flow. A controlled current excites the flowmeter with first and second amplitudes of current. A correction output represents the first and second amplitudes. A circuit connected to the correction output and the alternating potential oscillates at a frequency representing the alternating potential corrected for variation of the first and second amplitudes. Frequencies of the oscillations at first and second amplitudes are measured. An output is calculated as a function of a subtraction of the first and second measured frequencies such that the effect of offset is reduced.

15 Claims, 3 Drawing Sheets

CONVERSION CIRCUIT FOR AN ELECTROMAGNETIC FLOW TRANSMITTER

BACKGROUND OF THE INVENTION

The present invention relates to magnetic flow meters, and in particular, to circuits for converting sensed flow potential to an output.

In pulsed-DC electromagnetic flow meters, a transmitter provides a low frequency (typically 3–40 Hz) square wave current to coils on a flow tube to produce a square wave magnetic field in conductive fluid flowing through the flow tube. The magnetic field generates a square wave potential having an amplitude proportional to the flow according to Faraday's Law at electrodes on the flow tube. The potential is coupled through a cable back to the transmitter. The frequency of the square wave excitation is selected high enough to avoid interference from low frequency noise present in the flowing fluid, but low enough so that capacitive loading of the cable and inductive effects from the coils do not substantially distort the amplitude of the square wave potential. The flow transmitter converts the amplitude of the square wave potential to an output representing flow.

In the past a variety of conversion circuits have been used. Typically, the square wave potential is demodulated, providing a DC potential which, in turn, is presented to a voltage controlled oscillator (VCO) which provides a VCO frequency indicative of flow. Since a demodulated DC potential is presented to the VCO for conversion to a frequency, conversion accuracy depends on the zero point stability of the VCO. Maintaining the accuracy of the VCO at a desired level (0.1% of reading over a 50:1 range of flow, for example) over a long period of time with changes of temperature has been a problem. An arrangement is thus needed which does not require a high accuracy VCO for conversion.

Various circuits have also been used to convert the VCO frequency to an electrically isolated, adjustably scaled 4–20 mA analog output. Typically, the VCO frequency output is coupled to a divider which is adjustable to provide scaling. The output of the divider is fed through an optical coupler to a frequency to current converter circuit which converts the scaled frequency to a 4–20 mA output current. There is a desire to also provide a scaling adjustment with a wide range of adjustment, while providing a smooth, accurate conversion to a 4–20 mA output current from the scaled frequency.

SUMMARY OF THE INVENTION

In the present invention, a magnetic flow transmitter calculates a difference between two frequencies representing two levels of flow output to avoid offset errors inherent with analog subtraction methods.

The magnetic flowmeter generates an alternating potential representing flow. Control means control a current exciting the flowmeter alternately with different first and second amplitudes of current. The control means provide a correction output representing the first and second amplitudes. Oscillator means coupled to the correction output and the alternating potential oscillate at a frequency representing the alternating potential corrected for variation of the first and second amplitudes. Measuring means measure a first frequency of the oscillations after the current is controlled to the first amplitude and measure a second frequency of the oscillations after the current is controlled to the second amplitude. Output means calculate an output representing flow as a function of a subtraction of the first and second measured frequencies such that the effect of an offset in the alternating potential is reduced by the subtraction.

DETAILED DESCRIPTION OF THE PREFERRED EMBODIMENTS

Figure 1A:
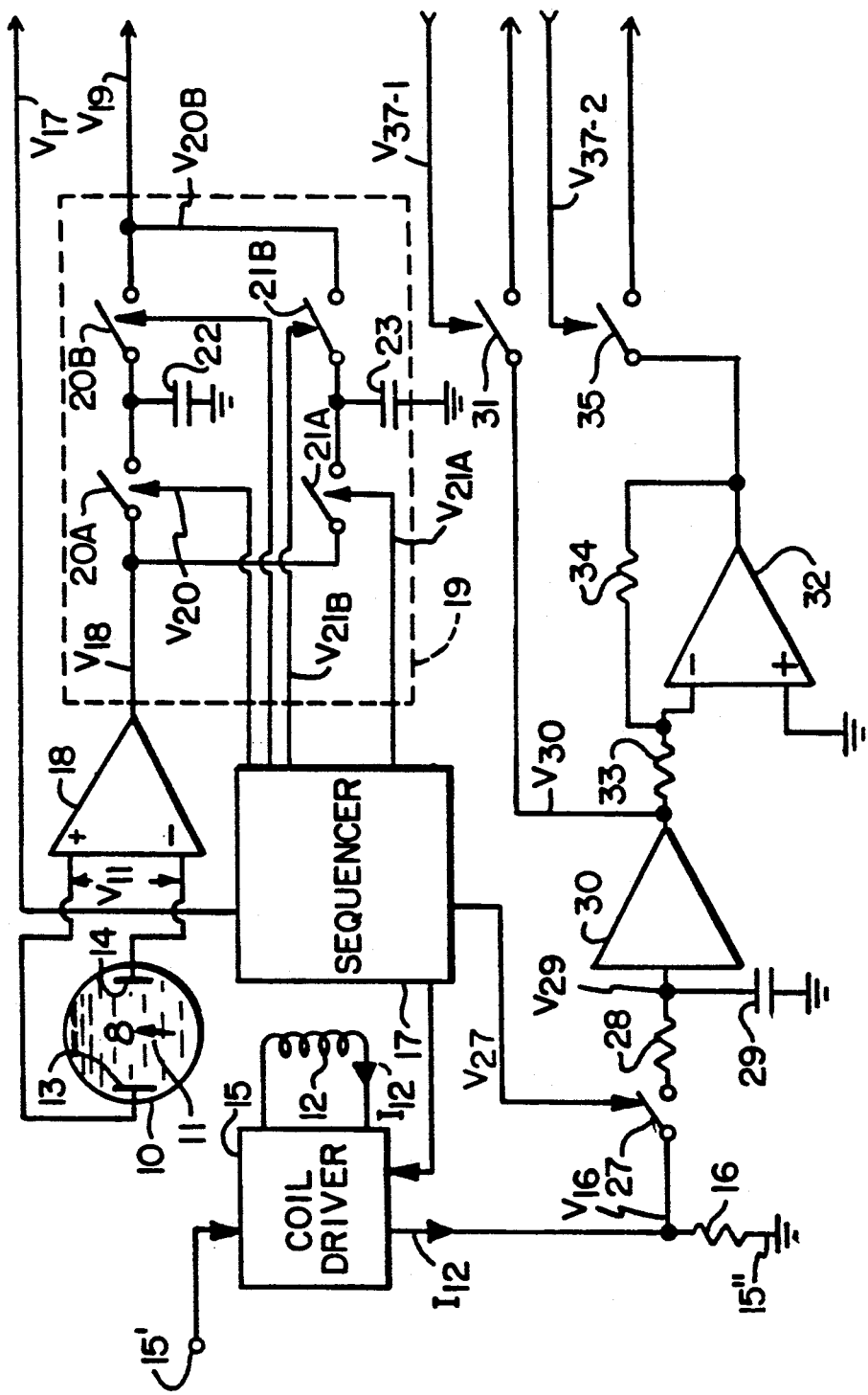
FIGS. 1A and 1B together show a mixed block and circuit schematic diagram of a flowmeter embodying the present invention.
Figure 2:
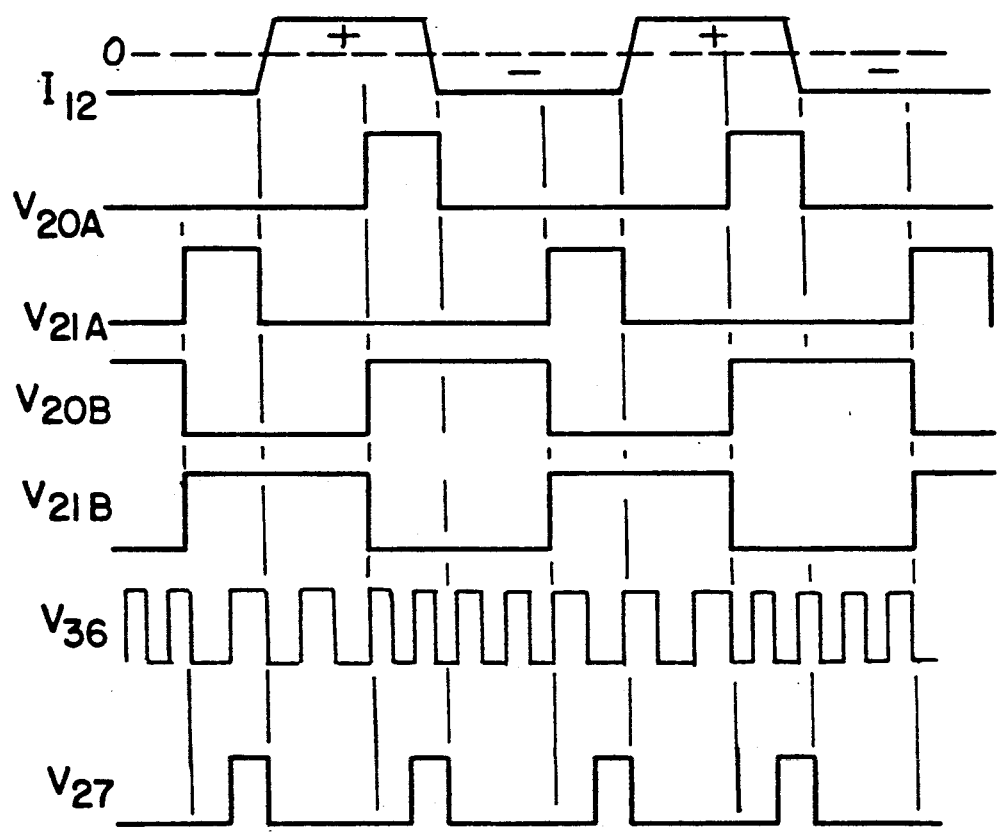
FIG. 2 shows a timing diagram of electrical signals from the circuit shown in FIGS. 1A and 1B.

In FIG. 1A, coil driver 15 generates current $I_{12}$ which flows through electromagnet 12. Reference potential 15' coupled to coil driver 15 controls the amplitudes of current $I_{12}$. Current $I_{12}$ is substantially a square wave as shown in FIG. 2 having a low repetition frequency controlled by sequencer 17. Sequencer 17 is preset to a selected low frequency by the user. Electromagnet 12 generates a magnetic field B transverse to a flow of fluid 11 in flow tube 10. Electrodes 13, 14 sense flow output $V_{11}$, a potential generated according to Faraday's Law in fluid 11. Flow output $V_{11}$ has an amplitude proportional to square wave current $I_{12}$ multiplied times the velocity of fluid 11 through flow tube 10, but is subject to undesired noise and offset potentials.

Amplifier circuit 18 receives flow output $V_{11}$ and amplifies it in a temperature-stable manner, filters some noise from it, and converts it to an amplified output $V_{18}$ which is referenced to DC common conductor 15''. Filtering in amplifier circuit 18 can be various forms of known analog filtering, or digital filtering controlled by sequencer 17. Amplified output $V_{18}$ is representative of flow, but is subject to noise and offsets not completely eliminated by amplifier circuit 18.

Amplified output $V_{18}$ is coupled to sample-and-hold circuit 19 comprising hold capacitors 22, 23 and solid state switches 20A, 20B, 21A, 21B controlled by sequencer 17. The sequencer 17 closes switches 20A, 20B, 21A, 21B by applying positive levels of control outputs $V_{20A}$, $V_{20B}$, $V_{21A}$, $V_{21B}$ respectively in synchronization with the square wave current $I_{12}$ as shown in FIG. 2. Switch 20A is closed during a time interval near the end of a positive half cycle of current $I_{12}$, thereby coupling the amplified output $V_{18}$ to capacitor 22 during a positive half cycle of current $I_{12}$. Switch 21A is closed during a time interval near the end of a negative half cycle of current $I_{12}$, thereby coupling the amplified output $V_{18}$ to capacitor 23 during a negative half cycle of current $I_{12}$. Switches 20A, 21A are closed long enough during their respective half cycles to permit charging the hold capacitors 22, 23 to store substantially the potential of the amplified output $V_{18}$.

As shown in FIG. 2, switch 20B is closed to couple the potential stored on capacitor 22 to sample-and-hold output $V_{19}$ during one half of a cycle time of the square wave current $I_{12}$; during the other half of each cycle time, switch 21B is closed to couple a potential stored on capacitor 23 to sample-and-hold output $V_{19}$. Switch 20A is held open when switch 20B is closed; and, switch 21A is held open when switch 21B is closed so that noise spikes are not coupled from amplified output $V_{18}$ through the sample-and-hold circuit 19 to the sample-and-hold output $V_{19}$. The sample-and-hold output $V_{19}$ thus alternates between two potentials, and the difference between these two potentials represent the flow output $V_{11}$. The sample and hold circuit 19 modulates the sample-and-hold output $V_{19}$ with a low frequency square wave which has the same frequency as the square wave modulation of the coil current $I_{12}$. The sample and hold output $V_{19}$ is thus modulated rather than demodulated.

Coil driver 15 full-wave rectifies current $I_{12}$ to provide rectified current $I_{12}'$ through current sensing resistor 16. The current flowing through resistor 16 is thus substantially free of low frequency modulation at the excitation frequency. Current sense resistor 16 thus develops a single polarity output $V_{16}$ which is representative of the amplitude of coil current $I_{12}$. The output $V_{16}$ is coupled to a low pass filter comprising switch 27, resistor 28, and hold capacitor 29 which filters out amplitude variations within a coil drive cycle. The sequencer 17 provides a control output $V_{27}$ which controls actuation of switch 27 as shown in FIG. 2. Switch 27 samples the rectified (that is, demodulated) output from current sensing resistor 16 and stores the sampled potential through resistor 28 on hold capacitor 29. The potential stored on capacitor 29 is thus representative of average amplitude of the current $I_{12}$, but is relatively free of variations which occur within an excitation cycle, such as asymmetry. Amplifier 30 amplifies the potential stored on hold capacitor 29 and couples an output $V_{30}$ representative of current amplitude through switch 31 and resistor 26 (FIG. 1B) to supply current to correction output $I_{26}$. The output $V_{30}$ is also coupled to a unity gain inverter comprising operational amplifier 32 and resistors 33, 34. The output of amplifier 32, which also represents the current amplitude, but has a polarity opposite the polarity of the output of amplifier 30, is coupled through switch 35 and resistor 26 (FIG. 1B) to supply current to correction output $I_{26}$.

Figure 1B:
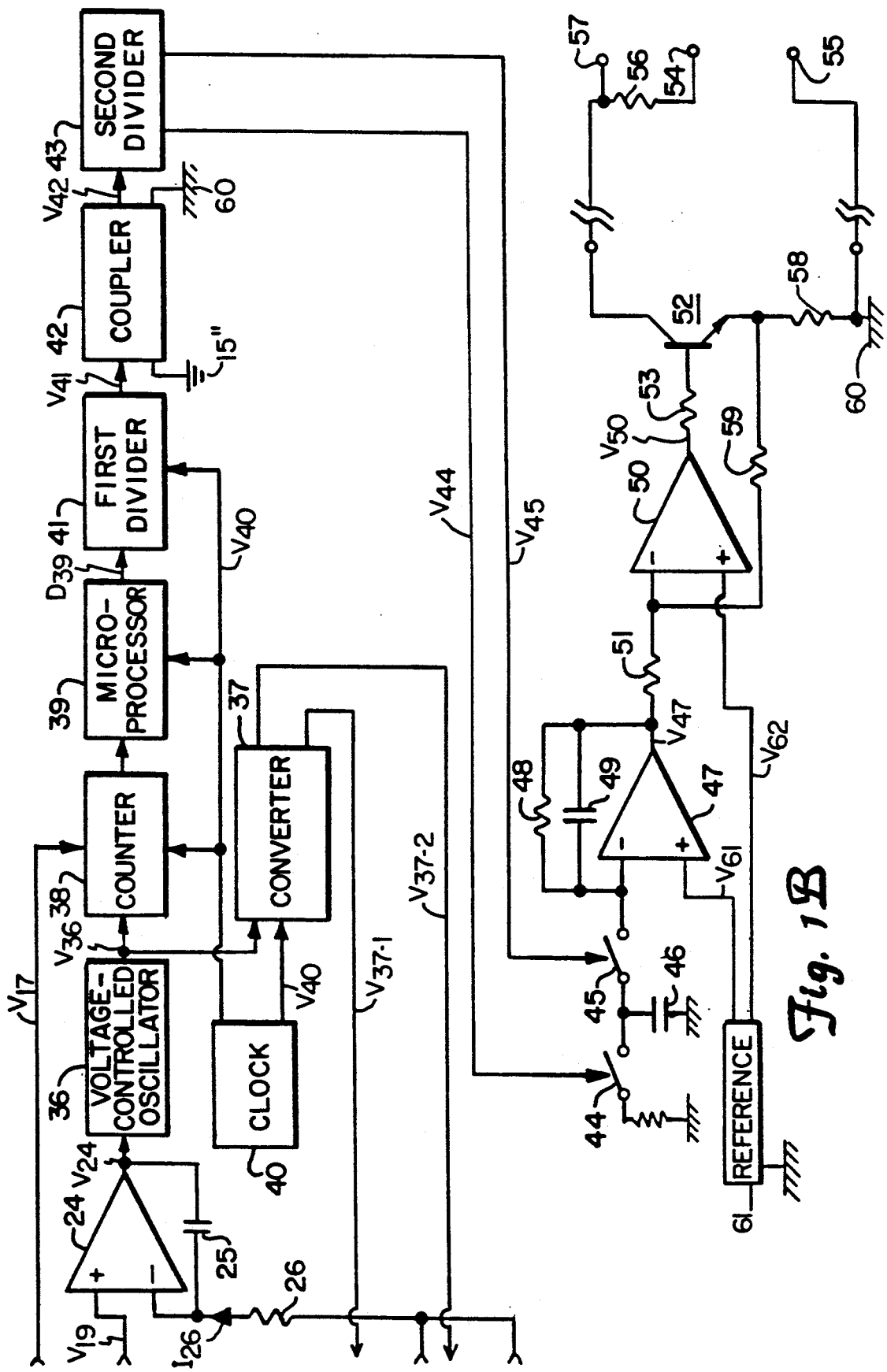

In FIG. 1B, correction output $I_{26}$ is coupled to a negative or inverting input of an integrator comprising amplifier 24 and capacitor 25. The sample-and-hold output $V_{19}$ is coupled to a positive input of the integrator comprising amplifier 24 and capacitor 25. The integrator generates an integrator output $V_{24}$ which is an integrated difference between the sample-and-hold output $V_{19}$ and the correction output $I_{26}$. Integrator output $V_{24}$ couples to the voltage sensing input of voltage controlled oscillator (VCO) 36. VCO 36 generates an oscillator output $V_{36}$ which has a frequency F which increases when the potential at the voltage sensing input increases, but can be subject to drift due to aging or temperature changes The oscillator output $V_{36}$ is illustrated in FIG. 2, however, the frequency is not shown at the same scale as other portions of the timing diagram. The full scale output frequency of the VCO is much higher than the coil drive frequency, typically 100 to 10,000 times higher, however, lower output frequencies are shown in FIG. 2 merely for clarity of illustration. The frequency of the oscillator output $V_{36}$ is frequency-modulated (FM) by the square wave potential $V_{24}$ sensed at the VCO input as shown in FIG. 2. The frequency of the oscillator output deviates to upper and lower deviation frequencies corresponding to the two levels of the square wave flow output. The difference between the upper and lower deviation frequencies is representative of flow.

A clock 40 associated with microprocessor system 39 provides a clock output $V_{40}$ which provides a stable frequency reference, and is preferably crystal-controlled.

The oscillator output $V_{36}$ and the clock output $V_{40}$ are coupled to frequency-to-duty cycle converter circuit 37. Converter circuit 37 provides duty cycle control outputs $V_{37-1}$ and $V_{37-2}$ which are logical complements of one another. The duty cycle control output $V_{37-1}$ has a duty cycle which is directly related to the frequency of the oscillator output $V_{36}$. The duty cycle control output $V_{37-2}$ has a duty cycle which is inversely related to the frequency of the oscillator output $V_{36}$. Such frequency-to-duty cycle conversion circuitry is known, for example, from U.S. Pat. No. 4,309,909 to Grebe, Jr. et al., incorporated herein by reference.

Control output $V_{37-1}$ controls actuation of switch 31 so that the closure time or duty cycle of switch 31 is directly related to the frequency of oscillator output $V_{36}$. Control output $V_{37-2}$ controls actuation of switch 35 so that the closure time or duty cycle of switch 35 is inversely related to the frequency of oscillator output $V_{36}$.

Operation of converter 37, switches 31, 35 and amplifier 30, 32 complete a feedback loop from oscillator output $V_{36}$ back to the voltage sensing input of VCO 36 which linearizes the frequency of the oscillator output $V_{36}$ with respect to integrated output $V_{24}$ and thus with respect to flow output $V_{11}$ as well.

The sample-and-hold output $V_{19}$ and the correction output $I_{26}$ both have amplitudes which are directly proportional to the current $I_{12}$. The integrator amplifier 24 effectively subtracts these two outputs so that the oscillator output $V_{36}$ is substantially independent of variation of the amplitude of the current $I_{12}$.

The VCO's output potential $V_{36}$, the clock output $V_{40}$ and a synchronizing output $V_{17}$ from sequencer 17 are all coupled to counter 38. Counter 38 counts or accumulates the number of oscillations of the oscillator output $V_{36}$ during a predetermined time interval controlled by the clock output. Synchronizer output $V_{17}$ synchronizes counting in counter 38 with coil drive and sample-and-hold operation, so that one count is accumulated while the oscillator output $V_{36}$ is at a steady higher frequency level (corresponding to a positive value of current $I_{12}$) and a second count is accumulated while the oscillator output $V_{36}$ is at a steady lower frequency level (corresponding to a negative value of current $I_{12}$). The counter 38 provides the first and second counts to microprocessor system 39 as two digital words.

Microprocessor system 39 subtracts the first count from the second count to calculate a difference between the two counts. Since both counts are affected in substantially the same way by DC offsets or zero shifts in the sensed, amplified, and sampled flow signal, the digital subtraction cancels the offsets. Since microprocessor 39 performs the subtraction digitally, offsets associated with analog subtraction are not introduced. Microprocessor system 39 effectively digitally demodulates the flow signal, that is, removes the square wave drive component from the flow signal, without introducing additional offset. Accuracy of measurement does not depend on zero point stability in voltage controlled oscillator 36 or integrator 24.

The microprocessor system 39 also stores correction constants in memory for further reducing non-linearities. The microprocessor generates an output $D_{39}$ comprising a digital word defining a division factor proportional to the measured flow as calculated from the two counts provided by counter 38. The division factor is preferably a hexadecimal number with a integer and fractional portion. The output $D_{39}$ couples to a first divider 41 which provides an output $V_{41}$ which has a frequency which is proportional or equal to the frequency of the clock output $V_{40}$ divided by the division factor $D_{39}$. Digital frequency division by a divisor having a integer and fractional part is known, as shown for example in U.S. Pat. No. 4,306,461 to Grebe, Jr., incorporated herein by reference. The output frequency of first divider output $V_{41}$ is inversely proportional to the flow of fluid 11.

Output $V_{41}$ of first divider 41 couples to an optical coupler 42 which galvanically isolates, or insulates circuitry referenced to the reference potential 15" associated with the ground of flow tube 10 from a different reference potential 60 associated with an isolated output circuit Isolated output $V_{42}$ of coupler 42 provides the scaled frequency from the first divider to second divider 43. Second divider 43 is a divide-by-two circuit which provides output $V_{44}$ and $V_{45}$ which are complementary flip-flop outputs, each having a 50% duty cycle.

Outputs $V_{44}$ and $V_{45}$ actuate switches 44 and 45. When switch 45 is closed, amplifier 47 charges capacitor 46 to the level of reference $V_{61}$ coupled to the amplifier 47. When switch 45 is opened and switch 44 is closed, the capacitor 46 is fully discharged through a current limiting resistor in series with the switch 44. The frequency or rate of charging and discharging is controlled by the frequency at the output of the second divider which is inversely proportional to flow. Current provided by amplifier 47 and output potential $V_{47}$ are inversely proportional to flow.

The output $V_{47}$ of amplifier 47 provides a current inversely proportional to flow through resistor 51 to a summing junction at an inverting input of amplifier 50. Reference 61 provides a reference potential $V_{62}$ to a non-inverting input of amplifier 50. The output potential $V_{50}$ of amplifier 50 is coupled through resistor 53 to a base of transistor 52. Transistor 52 controls current in a two wire, 4–20 mA loop energized at terminals 54, 55. Resistor 58 develops a potential proportional to current in the 4–20 mA loop, and the potential is coupled through a resistor 59 back to the summing junction to provide closed loop control of the current in the loop.

A direct current power supply is coupled to the loop at terminals 54, 55. A load device in the loop represented by a resistor 56 receives the loop current for monitoring or control.

Although the present invention has been described with reference to preferred embodiments, workers skilled in the art will recognize that changes may be made without departing from the spirit and scope of the invention.

What is claimed is:

1. A transmitter for use in a magnetic flowmeter generating an alternating potential representing flow, comprising:

means for controlling a current exciting the flowmeter alternately with different first and second amplitudes of current and for providing a correction output representing the first and second amplitudes;

means coupled to the correction output and the alternating potential for oscillating at a frequency representing the alternating potential corrected for variation of the first and second amplitudes;

means for measuring a first frequency of the oscillations after the current is controlled to the first amplitude and for measuring a second frequency of the oscillations after the current is controlled to the second amplitude; and means for calculating an output representing flow as a function of a subtraction of the first and second measured frequencies such that the effect of an offset in the alternating potential is reduced by the subtraction.

2. The transmitter of claim 1 wherein the oscillations are fed back to the means for providing a correction output such that the frequency is better representative of the alternating potential.

3. A circuit coupled to a flowmeter output which provides alternating levels corresponding to both varying fluid flow through the flowmeter and an alternating electric current energizing the flowmeter, the circuit providing an output indicating the varying fluid flow, the circuit comprising:

level sampling means having a level sampling input couplable to the the flowmeter output for providing a level sample output which successively generates an ordered sequence of selected samples representing at least portions of the alternating levels;

conversion means coupled to the level sample output for providing an oscillatory output presenting an ordered sequence of oscillations having frequencies corresponding to the samples;

frequency sampling means coupled to the oscillatory output for sampling the sequence of oscillations and providing a numeric output comprising a sequence of numbers indicating the frequencies; and calculating means coupled to the numeric output for calculating the output indicating a varying fluid flow as a function of a calculated difference between the numbers.

4. The apparatus of claim 3 wherein the level sampling means further comprises a first pair of controlled switching means coupled in series between the level sampling input and level sampling output, and further comprises a capacitance coupled to a junction coupling the first pair of switching means together.

5. The apparatus of claim 4 wherein the level sampling means further comprises a second pair of controlled switching means connected in series with one another between the level sampling means input and output, and further comprises another capacitance connected at a junction between each of the second pair of controlled switching means.

6. The apparatus of claim 4 further comprising a source of electrical signals synchonized with the electric current alternations controlling the first pair of controlled switching means such that a first one of the pair of controlled switching means is controlled to be "off" when a second one of the controlled switching means is controlled to be "on" such that noise conduction through the pair of controlled switching means is reduced.

7. The apparatus of claim 3 wherein the conversion means has a current input sensing the magnitude of the alternating electric current, the oscillatory output having a frequency representative of a ratio of magnitudes of the level sample output and the alternating electric current.

8. The apparatus of claim 7 wherein the conversion means averages the amplitudes of the alternations of the electric current, such that variations of the current amplitude in sequential pairs of alternations have a reduced effect on the oscillatory output.

9. Apparatus of claim 3 wherein the conversion means further comprises a voltage-controlled oscillator having a voltage input controlling the frequency of the oscillatory output, feedback means coupled to the oscillatory output and generating a feedback output having an analog, value representative of the frequency; combining means for combining the level sample output and the feedback output to provide the voltage input.

10. The apparatus of claim 9 wherein the combining means comprises differential integrating means.

11. The apparatus of claim 3 wherein the frequency sampling means further comprises controlled counter means controlled to count the ordered sequence of frequencies at the oscillatory output and providing an ordered sequence of counter output words to the numeric output.

12. The apparatus of claim 3 wherein the calculating means comprises a microprocessor.

13. A transmitter for use in a magnetic flowmeter generating a flow signal, comprising:
   means coupled to the flow signal for generating a scaled clock having a frequency inverse to the flow;
   means receiving the scaled clock for controlling the magnitude of a first current drawn at a circuit node therein received from a potential source, the magnitude of the first current drawn being based on the product of the potential of the potential source and the scaled clock frequency; and
   a circuit providing the potential source which delivers the first current to the node, the circuit further supplying an output current having an inverse relation to the first current, so that the inverse relation between the flow and the scaled clock frequency, the proportional relation between the scaled clock frequency and the first current and the inverse relation between the first current and the output current provides a proportional relationship between the flow and the output current.

14. The transmitter of claim 13 wherein the means for generating a scaled clock comprises:
   means for converting the flow signal to a flow word representing a division factor proportional to the flow;
   means for generating a clock output having a clock frequency;
   means receiving the flow word and the clock for generating the scaled clock having the scaled frequency controlled by the clock frequency and inversely proportional to the division factor.

15. A transmitter providing an output representing a sensor signal, comprising:
   means coupled to the sensor signal for generating a scaled clock having a frequency inverse to the sensor signal;
   means receiving the scaled clock for controlling the magnitude of a first current drawn at a circuit node therein received from a potential source, the magnitude of the first current drawn being based on the product of the potential of the potential source and the scaled clock frequency; and
   a circuit providing the potential source which delivers the first current to the node, the circuit further supplying an output current having an inverse relation to the first current, so that the inverse relation between the sensor signal and the scaled clock frequency, the proportional relation between the scaled clock frequency and the first current and the inverse relation between the first current and the output current provides a proportional relationship between the sensor signal and the output current.

* * * * *

UNITED STATES PATENT AND TRADEMARK OFFICE
CERTIFICATE OF CORRECTION

PATENT NO.  :  5,079,957
DATED       :  January 14, 1992
INVENTOR(S) :  DAVID L. WEHRS It is certified that error appears in the above-identified patent and that said Letters Patent is hereby corrected as shown below:

Col. 2, line 1, after "to", delete ".."

Col. 3, line 4, delete "represent", insert "represents"

Col. 5, line 20, after "circuit", insert a "."

Col. 7, line 11, after "analog", delete ","

Signed and Sealed this

Twenty-fifth Day of May, 1993

Attest:

MICHAEL K. KIRK

Attesting Officer       Acting Commissioner of Patents and Trademarks